(12) United States Patent
Kim et al.

(10) Patent No.: US 7,330,791 B2
(45) Date of Patent: Feb. 12, 2008

(54) METHOD FOR RAPID FAULT INTERPRETATION OF FAULT SURFACES GENERATED TO FIT THREE-DIMENSIONAL SEISMIC DISCONTINUITY DATA

(75) Inventors: Chul-Sung Kim, Houston, TX (US); Dominique G. Gillard, Houston, TX (US); James E. Holl, Houston, TX (US); Mark Dobin, The Woodlands, TX (US); Thomas A. Hauge, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 10/527,415

(22) PCT Filed: Sep. 17, 2003

(86) PCT No.: PCT/US03/29424

§ 371 (c)(1),
(2), (4) Date: Oct. 23, 2006

(87) PCT Pub. No.: WO2004/038654

PCT Pub. Date: May 6, 2004

(65) Prior Publication Data

US 2007/0078604 A1 Apr. 5, 2007

Related U.S. Application Data

(60) Provisional application No. 60/419,505, filed on Oct. 18, 2002.

(51) Int. Cl.
*G01V 1/30* (2006.01)
*G01V 1/28* (2006.01)

(52) U.S. Cl. .................................................... 702/16
(58) Field of Classification Search ................ 702/14, 702/16, 17, 18; 367/73
See application file for complete search history.

(56) References Cited

U.S. PATENT DOCUMENTS

| | | | |
|---|---|---|---|
| 5,537,320 A | 7/1996 | Simpson et al. | 364/421 |
| 5,563,949 A | 10/1996 | Bahorich et al. | 364/421 |
| 5,838,564 A | 11/1998 | Bahorich et al. | 364/421 |
| 5,987,388 A | 11/1999 | Crawford et al. | 702/16 |
| 6,014,343 A | 1/2000 | Graf et al. | 367/38 |

(Continued)

OTHER PUBLICATIONS

Bosnjak, A. et al. (2000) "Segmentation and VRML Visualization of Left Ventricle in Echocardiographic Images Using 3D Deformable Models and Superquadrics", *Proceedings of the 22nd Annual International Conference of the IEEE Engineering in Medical and Biology Science*, vol. 3, Jul. 2000, pp. 1724-1727.

(Continued)

Primary Examiner—Donald E McElheny, Jr.

(57) ABSTRACT

A method to extract fault surfaces from seismic data (1,3) is disclosed. The method comprises: (a) generating at least two fault sticks (5) from the same fault from at least two slices of the seismic data wherein each slice comprises at least one fault stick from the same fault, (b) constructing an initial three-dimensional fault surface (7) containing the fault sticks, and (c) reconstructing the initial fault surface (9) using a deformable surface model to fit discontinuity or coherency information in the seismic data in an iterative process. Techniques are disclosed for constructing the initial fault surface from interpreter-provided fault nodes, and for performing the deformable surface iteration by defining an energy function for the fault surface and then minimizing the surface energy.

14 Claims, 5 Drawing Sheets

U.S. PATENT DOCUMENTS

| | | | |
|---|---|---|---|
| 6,018,498 A | 1/2000 | Neff et al. | 367/72 |
| 6,078,680 A | 6/2000 | Yoshida et al. | 382/128 |
| 6,249,594 B1 | 6/2001 | Hibbard | 382/128 |
| 6,516,274 B2 * | 2/2003 | Cheng et al. | 702/14 |
| 2001/0047245 A1 | 11/2001 | Cheng et al. | 702/14 |

OTHER PUBLICATIONS

Cohen, L. D. and Cohen, I. (1993) "Finite-Element Methods for Active Contour Models and Balloons for 2-D and 3-D Images", *IEEE Transactions on Pattern Analysis and Machine Intelligence*, vol. 15, No. 11, Nov. 1993, pp. 1131-1147.

Hernandez-Hoyos, M. et al. (2000) "A Deformable Vessel Model with Single Point Initialization for Segmentation, Quantification and Visualization of Blood Vessels in 3D MRA", *Proceedings of the 3rd International Conference of Medical Imaging Computing and Computer-Assisted Intervention*, Oct. 2000, pp. 735-745.

Kass, M. et al. (1988) "Snakes: Active Contour Models", *International Journal of Computer Vision*, vol. 1, pp. 321-331.

* cited by examiner

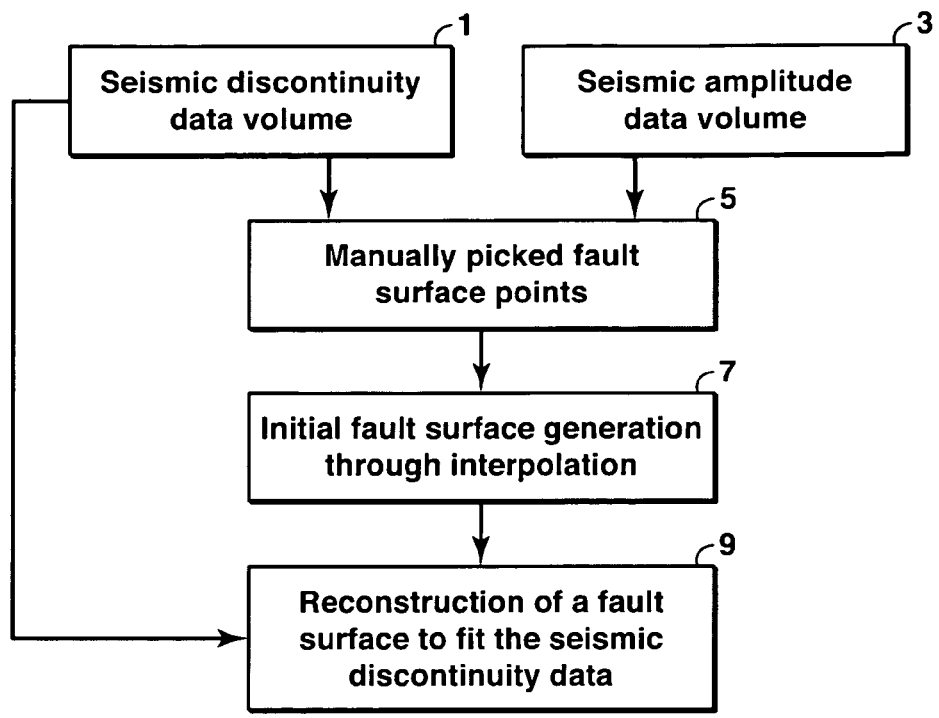
FIG. 1
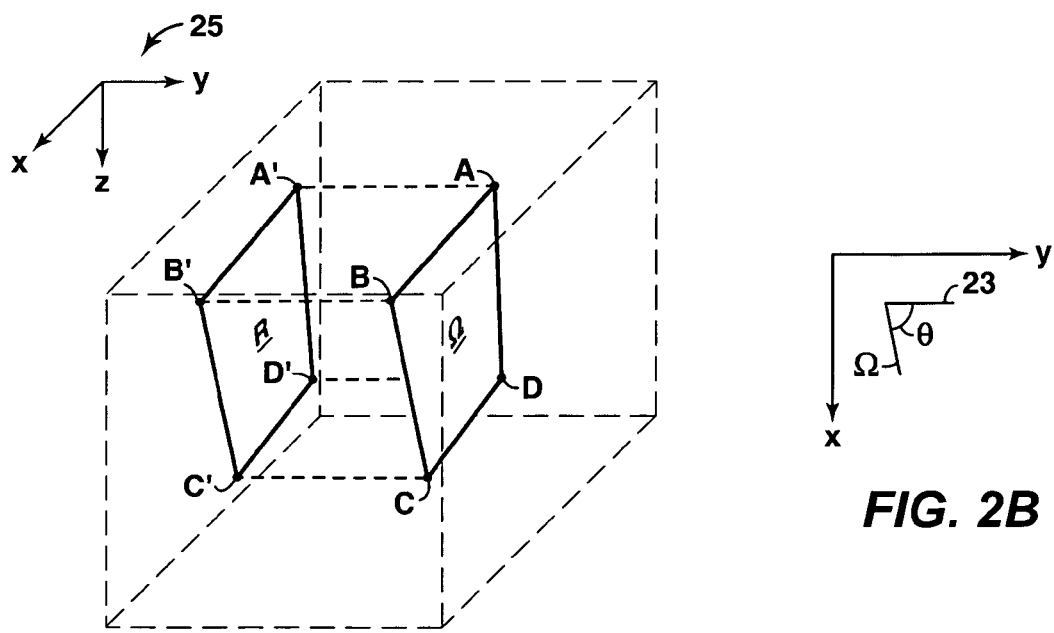
FIG. 2A
FIG. 2B

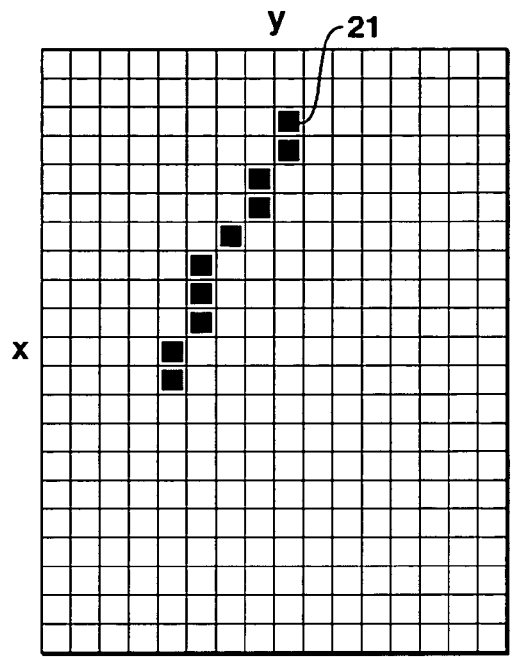
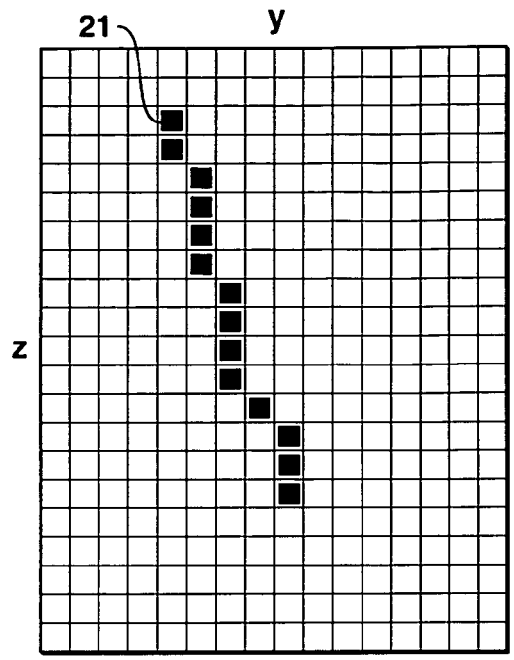
FIG. 3A  FIG. 3B
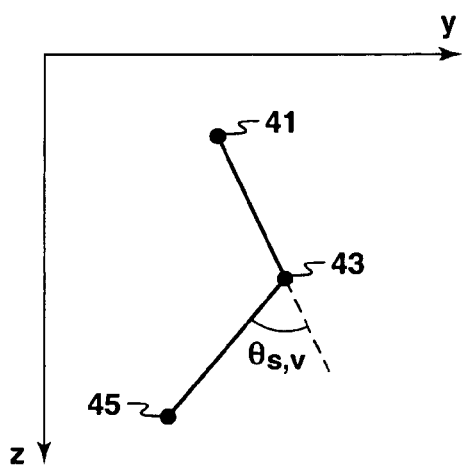
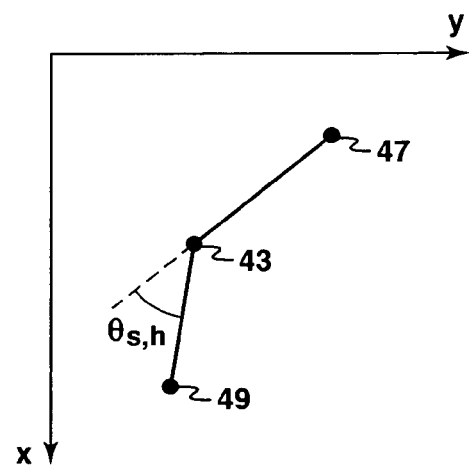
FIG. 4A  FIG. 4B

METHOD FOR RAPID FAULT INTERPRETATION OF FAULT SURFACES GENERATED TO FIT THREE-DIMENSIONAL SEISMIC DISCONTINUITY DATA

This application claims the benefit of U.S. Provisional Application No. 60/419,505 filed on Oct. 18, 2002.

FIELD OF THE INVENTION

This invention generally relates to geologic fault surfaces. More specifically, this invention is a method to interpret and construct a geologic fault surface to fit three-dimensional seismic discontinuity data.

BACKGROUND

In hydrocarbon system evaluations, mapping faults and fault networks is essential to determine the migration pathways from the source to the reservoir. Faults can also help trap hydrocarbons or fragment a reservoir and therefore cause complications during field production.

Fault interpretation and fault network interpretation in three-dimensional seismic data can be facilitated and accelerated by the use of seismic amplitude discontinuity data. For example, U.S. patent application Ser. No. 09/827,574 (Cheng et al.) discloses a method of identifying structural and stratigraphic discontinuities in a three-dimensional seismic data volume through the use of seismic amplitude discontinuity data. In Cheng et al, the continuity of seismic reflectors in a volume of seismic amplitude data is measured by computing the correlation coefficient between adjacent seismic traces over a movable vertical window. A low coefficient of correlation indicates that the reflector is discontinuous. Repeating this practice over an entire volume of seismic data creates a discontinuity cube characterizing the continuity of the reflectors in the seismic volume. Since faults are detected by looking at vertical offsets of seismic reflectors, the discontinuity cube is a preferred way to image faults and fault networks in a volume of seismic data.

Other methods for detecting faults include converting seismic data volumes into cubes of coherency measurements herein referred to as "seismic coherency cubes." This method is disclosed by U.S. Pat. Nos. 5,563,949 and 5,838,564 (Bahorich and Farmer), which are commonly known as the "coherency cube" patents. For purposes of this application, seismic coherency cube data and seismic discontinuity cube data can be used interchangeably as fault-indicating parameters in the inventive method claimed in this application, both as a substitute for each other or in combination.

Current technology in fault interpretation focuses on automatic fault detection and extraction using amplitude and coherency data. One characteristic of automatic fault detection is that no preexisting fault interpretations are required for automatic fault detection. However, a key issue in automatic fault detection is the quality of the seismic amplitude and coherency data used to detect the faults. Therefore, automatic fault detection methods require preprocessing of seismic data to enhance the quality of the fault signature in amplitude and coherency data and to facilitate generation of specific criteria to facilitate differentiation of true faults from false fault signatures during the extraction process. For example, U.S. Pat. No. 5,987,388 (Crawford et al.) discloses an automatic fault detection method. Another approach based on mathematically inserting test planes into a volume of seismic data to approximate dip and azimuth of potential fault surfaces is disclosed in U.S. Pat. No. 6,018,498 (Neff et al.).

Automatic fault detection may work well with extremely good quality data. However, many seismic data volumes do not have the quality required for automatic methods. Therefore, auto-assisted methods where the seismic interpreter guides the computer by inserting partial interpretations generally are more reliable, particularly with data of lesser quality.

U.S. Pat. No. 5,537,320 (Simpson et al.) discloses one example of an auto-assisted method. This method starts with a manually interpreted fault stick line (a piecewise linear line), which is defined by at least two fault nodes, in a vertical slice of a seismic amplitude volume. A "fault stick" represents the intersection of a fault surface and any planar slice of the data volume. The nodes are points in the slice lying along the fault, and are typically identified by a seismic interpreter. The method of Simpson et al. requires several processes that are used to refine and extend the initial fault seed nodes or initial points designated by the user to represent the fault. First, a "snap" process moves the fault seed nodes so as to be located at voxel points at which minimum correlation occurs between seismic amplitudes in either side of the fault nodes. Voxel points are points in space (or in a grid of a three-dimensional volume) with a location (such as (x,y,z) coordinate) and value (typically, grayscale from 0-255) representing seismic amplitude or its discontinuity. The next step is to extend the two end-point fault seed nodes. An end-point fault seed node is a fault point located at the two ends of a fault stick (or fault polyline). The two end-point fault seed nodes are extended in upward and downward directions respectively with a fixed length and the process makes a decision if the two end-nodes can be extended. The final step projects the snapped and extended fault nodes to a next vertical slice. These projected fault nodes serve as new fault seed nodes and the process is repeated. In this three-step process, a quality control threshold value is used to stop extensions in vertical directions and into the next slices.

The Simpson et al. processes do not use the three-dimensional information inherent in the fault surfaces in a seismic amplitude cube. The "snap" process is a two-dimensional operator, meaning that the decision on moving a fault node in one vertical slice is based only on the information obtainable from that vertical slice. Even in a given vertical slice, the movement of one node is not constrained in any way by the location of the other nodes in the same vertical slice. Furthermore, the technique is not able to handle the fault nodes selected in horizontal slices and vertical slices together. Segmentation of the shapes and boundaries of a three-dimensional object based on a two-dimensional operator without sufficient smoothness constraints is known in the art to be very susceptible to noise in voxel values.

In one variation, disclosed in Simpson et al., fault seed nodes in two or more vertical slices are jointly interpolated to generate fault seed nodes for intervening vertical slices. These newly created nodes in each vertical slice are refined by using the "snap" process in each vertical slice.

The result of these prior art hydrocarbon system oriented techniques is the characterization of the object of interest, generally a fault surface, in the three-dimensional data set. The problem of finding and parameterizing shapes and boundaries of an object in two- and three-dimensional images has also been extensively studied in the image analysis and computer vision literature. Promising models that have robustness to noise and the flexibility to represent a broad class of shapes include deformable surface models and their two-dimensional analog, active contours. See, for example, M. Kass, et al. "Snakes: active contour model," *Int. J. Comput. Vision* 1, 321-331 (1988). Kass discloses two-dimensional models, but the principles for three-dimensional models are the same. A deformable surface behaves like an elastic sheet. Initially placed close to a boundary of interest, a deformable surface deforms towards the desired boundary under the influence of external forces (attraction toward salient voxel features or anomalies in the data such as high discontinuity) and internal elastic forces (surface smoothness constraints). Variations of deformable models have been successfully utilized in reconstructing boundaries of brain, heart tissue, and blood vessels from medical images. Examples of references disclosing three-dimensional models for medical applications include L. Cohen and I. Cohen, "Finite-element methods for active contour models and balloons for 2-D and 3-D images," *IEEE Trans. PAMI* 15, No. 11 (1993); A. Bosnjak, et al., "Segmentation and VRML visualization of left ventricle in echocardiograph images using 3D deformable models and superquadrics," *Proceedings of the 22nd Annual International Conference of the IEEE Engineering in Medicine and Biology Society* 3, 1724-1727 (July, 2000); and M. Hernandez-Hoyos et al., "A deformable vessel model with single point initialization for segmentation, quantification and visualization of blood vessels in 3D MRA," *Proceedings of the Third International Conference of Medical Imaging Computing and Computer-Assisted Intervention*, 735-745 (October 2000).

Patents have been issued for using two-dimensional deformable models for automatically determining the boundaries of objects in three-dimensional topographic images (U.S. Pat. No. 6,249,594), and using wavelet coefficients and a two-dimensional model for the detection of nodules in biological tissues (U.S. Pat. No. 6,078,680). Deformable models have been applied to geoscience by Apprato et al, who used a traditional two-dimensional deformable model on a sea floor image to detect a fault line. D. Apprato, C. Gout, and S. Vieira-Teste, "Segmentation of complex geophysical 3D structures," *Proceedings of IEEE 2000 National Geoscience and Remote Sensing Symposium*, p. 651-653, July, 2000. Apprato et al uses a standard two-dimensional deformable model for fault segmentation, but on a two-dimensional sea floor image. The model is not suitable for a three-dimensional fault surface segmentation because the model does not utilize seismic volume data that is required for three-dimensional fault surface construction.

Due to the above-mentioned difficulties with traditional automatic interpretations, faults are typically interpreted manually using both amplitude and discontinuity data. The interpreter scrolls through the vertical section of the seismic amplitude cube and digitizes the fault sticks. The fault interpretation is simultaneously co-referenced on time slices of the discontinuity cube for verification that the interpretation satisfies the fault trace on the discontinuity time slice. Depending on the level of accuracy required and the complexity of the fault network, the operator or interpreter may increase the number of fault sticks necessary to describe the fault. Finally, the interpreted fault is gridded or triangulated to create a fault surface using commercially available software (i.e., Gocad™ or Voxelgeo™). The problem with existing methods is that traditional manual interpretation methods require time consuming dense fault sticks for an accurate fault surface and automatic interpretation methods lack accuracy in three-dimensions. Accordingly, there is a need for a rapid, accurate, fault interpretation method. The present invention satisfies that need.

SUMMARY

A method to create fault surfaces from a three-dimensional seismic data volume is disclosed. In one embodiment, the method comprises: (a) generating at least two fault sticks containing interpreter-provided fault nodes, each fault stick coming from a different slice of the data volume; (b) constructing an initial three-dimensional fault surface that includes the fault sticks; and (c) reconstructing the fault surface to fit the seismic amplitude discontinuity or coherency information in the data by iterating a deformable surface model to obtain a realistically smooth surface that passes through voxels having high values of seismic amplitude discontinuity or low values of amplitude coherence. In some embodiments, the iteration of the deformable surface model is accomplished by local minimization of an energy function of the surface, where the surface energy is a function of the curvature of the fault surface and either the degree of seismic amplitude discontinuity or the degree of seismic amplitude coherency on the fault surface. In some embodiments, the surface energy function is a weighted sum of an internal force being a function of surface curvature and representing a smoothness constraint, and an external force being a function of discontinuity or coherency and tending to cause the surface to pass through voxels having high values of discontinuity or low values of coherency. Specific energy functions in the form of weighted sums are disclosed as examples. A preferred method of constructing the initial fault surface from the user-provided fault sticks is disclosed. A method of speeding up the iteration of the deformable surface model is disclosed taking advantage of the fact that fault surfaces tend toward being vertical planar surfaces.

BRIEF DESCRIPTION OF THE DRAWINGS

FIG. 1 shows a flowchart of an embodiment of the present invention for fault surface construction;

FIGS. 2A and 2B show a three-dimensional fault surface represented by y=f(x, z);

FIG. 3A shows a fault surface in the x-y plane;

FIG. 3B shows a fault surface in the y-z plane;

FIG. 4A shows surface curvature of a fault surface in the y-z plane;

FIG. 4B shows surface curvature of a fault surface in the x-y plane;

DETAILED DESCRIPTION

Figure 5:
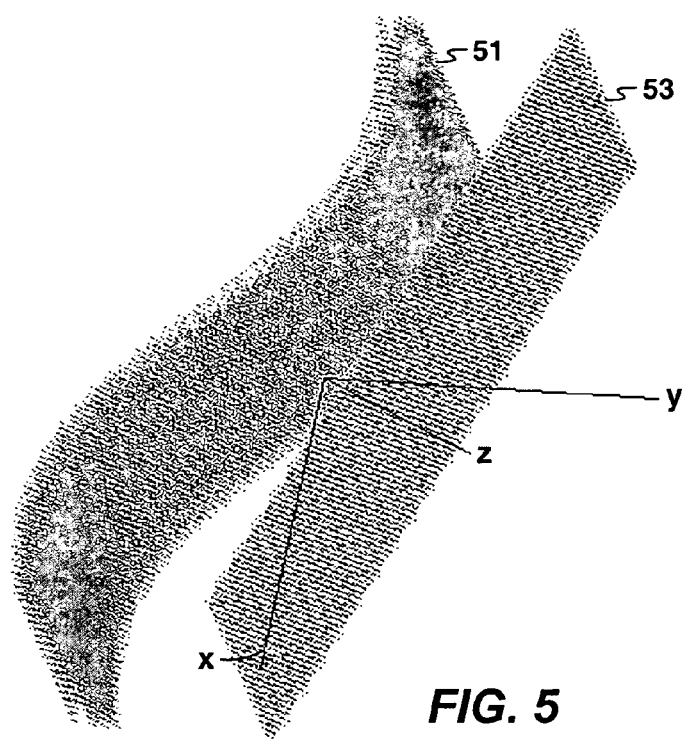
FIG. 5 shows a target fault surface and an initial fault surface.

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

One embodiment of the method disclosed below comprises four steps. First, at least two fault interpretations are generated. Preferably, the fault interpretations are generated manually using widely spaced or sparse fault sticks. Second, an initial fault surface is constructed. The fault surface may be generated automatically by bilinearly interpolating the fault sticks. Third, a fault surface is reconstructed to fit the seismic amplitude discontinuity data. Preferably, in this step, the initial fault surface is reconstructed to fit the discontinuity data through use of a modified deformable surface algorithm. Fourth, fault sticks or surface points are outputted (such as displayed) at user or operator defined intervals. This method creates fault interpretations faster and with higher accuracy.

The first step requires the operator to manually generate fault interpretations using fault sticks. The operator can generate the fault interpretation manually using techniques known to persons skilled in the art. In one embodiment of this invention, the fault surfaces are generated (the second step in the previous paragraph) by using operator provided sparse fault interpretations in vertical as well as horizontal slices of a seismic volume as input. The inputted interpretations are then used to define the areas of the fault surface and construct an initial fault surface. This initial surface is subsequently improved or reconstructed by minimizing a cost function that is composed of the smoothness of the surface and the degree of discontinuity in the surface.

The fault surface is preferably reconstructed (the third step as discussed previously) utilizing a deformable surface model. The deformable surface model is specifically formulated for constructing fault surfaces, which are substantially vertical and smooth without meandering complex curvatures.

The philosophy of the deformable model approach is to introduce an initial fault surface in the vicinity of a desired fault surface and let it evolve from an initial position. The evolution is under the action of both internal forces (smoothness constraints) and external forces (attraction toward salient voxel features such as high discontinuity). Therefore, the energy function of a surface is formulated to represent these two interacting forces. Then the evolution or the deformation of a surface takes place as the energy function is minimized until it reaches a local minimum energy state. Since the optimization guarantees only a local minimum, an initial fault surface is preferably located fairly near the desired fault boundaries for an effective fault surface reconstruction.

The objective of using this deformable model is to construct a "smooth surface" that passes through high discontinuity voxels in a given region of discontinuity voxel volume. Compared to the Simpson et al. process, this method will be more robust to noise and produce more detailed fault surfaces. The simultaneous optimization of the local curvatures and the degree of discontinuity in the fault surface in three-dimensional space provides for more detailed fault surfaces and additional robustness to noise. Compared to other deformable models, the method disclosed by this invention is faster with higher resolution by taking advantage of the generally smooth and vertical characteristics of fault surfaces.

FIG. 1 is a flow chart illustration of this computer aided fault surface construction process. First, seismic discontinuity data volume 1 and seismic amplitude data volume 3 are inputted into the computer. The operator manually picks fault surface points 5 from the inputted data (such as, seismic amplitude data volume or discontinuity data) by drawing fault sticks from the data inputted in the first step. Next, an initial surface is generated through interpolation 7. Finally, a fault surface is reconstructed to fit the seismic data. The reconstruction is preferably generated through an iterative evolution of at least one fault surface through energy minimization 9.

As discussed above seismic data is inputted into the computer. As shown in FIG. 1, the data consists of seismic amplitude data volume 3 and seismic discontinuity data volume 1. Furthermore, and as discussed above, coherency data volume can be used as a replacement for discontinuity data volume for purposes of this invention. For this invention there is no preprocessing required. However, in a preferred mode, seismic data can be preprocessed by a special noise reduction filter (such as a median filter) to improve the discontinuity cube data. Persons skilled in the art will recognize known processing techniques for improving the seismic data.

As shown in FIG. 1, the operator manually picks fault sticks in at least two slices 5. The slices can be either vertical or horizontal slices and can be picked at random or the slice can be picked to represent features of interest. Preferably, the slices picked by the operator would be at least one horizontal slice (x-y slice) and at least two vertical slices (x-z and y-z slices). More preferably, the slices would represent at least one x-y slice, at least one x-z slice, and at least one y-z slice. However, the slices can be two slices of parallel planes. Increasing the number of slices with manually picked fault surfaces would increase the number of fault features represented and would increase the accuracy of the method.

A set of fault points (or fault nodes) that belong to an initial fault surface are provided by a manual fault surface point picking process in vertical as well as horizontal slices of a seismic volume. In step 7 of FIG. 1, these initial fault surface points are interpolated to generate an initial fault surface 7. Signatures of fault surface points are best-detected in horizontal and vertical slices of a seismic amplitude and discontinuity data volume. Interpreters may use any graphical interface tool (such as Voxelgeo™) to pick fault surface points at vertical and/or horizontal slices and store these surface point coordinates into a computer's memory. The initial fault surface points from step 5 of FIG. 1 are picked from two-dimensional slices but the fault surface resulting from step 7 is generated through interpolation in three-dimensions.

In most three-dimensional deformable models a fault surface is defined by a set of discrete points. These discrete points are later moved to the desired boundaries of an object by minimizing surface energy, which is a function of image pixel values and curvature at the surface. In the prior art processes, considerable computation time is required to resample the discrete points because the distribution of discrete points becomes irregular as they are moved in normal directions to surface curvatures. Furthermore, the computation of curvatures becomes very complex and time consuming. In some deformable models, finite element methods are used to reduce the complexity and the computing time of the curvatures.

FIG. 2A illustrates a data volume containing a fault surface Ω defined at regular intervals inside the domain R in the x-z plane. The three axes of the data volume are represented by the x-y-z arrows 25. The fault surface Ω is bounded by points A, B, C and D. The dotted line connects the fault surface with domain R to illustrate the projection of the fault surface points A, B, C, and D onto the domain R bounded by points A', B', C' and D'. For illustrative purposes, the value of x increases from A to B and x increases from D to C on the fault surface Ω.

In order to take advantage of the relatively simple shape of geologic faults (such as their substantially vertical, smooth, and non-closing surfaces), a fault surface in this invention is assumed to be representable by a single valued function in the form of x=f(y, z) or y=f(x, z), where x and y are geographic coordinates in a horizontal plane and z is a vertical depth (or time) coordinate. A functional form of y=f(x, z) will be used if the angle θ between the intersection of the fault surface Ω and a plane parallel to the y-z plane is greater than 45 degrees. Otherwise, a functional form x=f(y, z) will be used to represent a fault surface. FIG. 2B illustrates a fault surface Ω represented by y=f(x, z), where the angle θ between the intersection of the fault surface Ω and a plane parallel to the y-z plane 23 is assumed to be greater than 45 degrees. In this invention, as shown in FIG. 2A, a fault surface function y=f (x, z) will be defined at regular intervals inside the domain R in the x-z plane, which is a projection of a fault surface Ω onto an x-z plane.

FIG. 3A and FIG. 3B illustrate resulting discrete voxel representations of a fault surface 21 function y=f(x, z) at a horizontal slice (x-y plane) and a vertical slice (x-z plane, or y-z plane) respectively. In this example, a y-z plane was used to represent a vertical slice. It should be noted that, at both slices, y is a single valued function of x and z. With this surface representation, all the voxels in a fault surface will be allowed to move only along a y direction (x direction for a fault surface with x=f(y, z) representation). In other deformable models (such as, U.S. Pat. Nos. 6,078,680 and 6,249,594), sparsely located surface points are allowed to move in normal directions to the surface and the mathematical function describing a surface becomes more complex than the one in this invention. This simplified approach takes advantage of the relatively simple shape of geologic faults and eliminates the need for a complex surface representation, complex curvature computation, and re-sampling of fault surfaces at each iteration of the energy minimization process.

Given a set of initial fault surface points, the functional form of a fault surface (either x=f(y, z) or y=f(x, z)) is determined by estimating the angle θ between a best fitting plane through the fault surface points and y-z plane. For simplicity, but not meant to be limiting, the example illustrated in FIG. 2B, has an angle θ greater than 45 degrees and uses a fault surface function y=f(x, z) in describing the invention.

An initial fault surface can be generated (7 in FIG. 1) in three steps. In the first step, a linear interpolation is determined between initial user provided fault surface points in at least two slices (preferably, at least one horizontal and at least two vertical slices). Second, the extent of the fault surface boundaries are identified by using the interpolated fault points in the previous step. For the example (illustrated in FIG. 2A) of fault surface function y=f(x, z), this process pertains to the definition of the domain R in (x, z). Finally, an initial fault surface is constructed by using bilinear interpolation of interpolated fault points in the previous step (step 5 of FIG. 1).

As shown as step 9 in FIG. 1, the final step is a reconstruction of the fault surface to fit the seismic data. Preferably, the reconstruction is through an iterative evolution of the fault surface through energy minimization. The energy minimization is preferably accomplished through use of a deformable model.

In the present example, a deformable surface model is used for the iterative evolution of a fault surface through energy minimization as shown as the final step 9 in FIG. 1. The use of a deformable surface model requires an initial fault surface to be located in the vicinity of an unknown fault surface. Then, the initial fault surface is deformed toward a final fault surface by minimizing the energy of the fault surface in an iterative way 9. In this example, the energy of a fault surface is defined as a weighted sum of the discontinuity voxel values, which represent the degree of discontinuity in seismic amplitudes at a fault surface, and the curvatures of the fault surface at voxel locations belonging to the fault.

One embodiment of an energy function of a surface Ω may be formulated as a weighted sum of internal force $v_s$ and external force $p_s$ defined at points s in regular intervals of (x, z) in Ω:

$$E = \sum_{s \in \Omega} (\lambda v_s + (1-\lambda) p_s) \tag{1}$$

where λ is a weight between the two forces $v_s$ and $p_s$. The internal force $v_s$ at a point s in a surface Ω represents smoothness constraint. The smoothness constraint emulates elastic property of a surface at a point s. Thus, limiting the extreme curvature of the surface. In this embodiment, $v_s$ is defined as the sum of the smoothness measured in vertical and horizontal directions. Let s be the point at (x, y, z). Then $v_s$ is defined as:

$$v_s = v_{s,v} + v_{s,h} \tag{2a}$$

$$v_{s,v} = 1 - \cos \theta_{s,v} \tag{2b}$$

$$v_{s,h} = 1 - \cos \theta_{s,h} \tag{2c}$$

where, as depicted in FIG. 4A, $\theta_{s,v}$ is an angle between two vectors connecting point 41 with coordinates $(x, y_u, z-l_v)$ with point 43 with coordinates (x, y, z) and point 45 with coordinates $(x, y_d, z+l_v)$ in an x slice. In the present example, $y_u$ and $y_d$ are the y values of the single valued fault surface function y=f(x, z) at $(x, z-l_v)$ and $(x, z+l_v)$ respectively. As shown in FIG. 4B, the angle $\theta_{s,h}$ is an angle between two vectors connecting points $(x-l_h, y_r, z)$ 47, (x, y, z) 43, and $(x+l_h, y_l, z)$ 49 in a z slice. Again, $y_r$ and $y_l$ are the corresponding y values from a single valued fault surface function y=f(x, z) at $(x-l_h, z)$ and $(x+l_h, z)$ respectively. The parameters $l_v$ and $l_h$ are chosen by the operator and represent respectively the vertical and horizontal lengths of a window, for which internal force and external force are computed for each fault surface point s. This internal force serves to impose smoothness on the fault surface.

The external forces pushing the surface toward salient voxel features such as low coherency (inverse if discontinuity data is utilized) is defined as:

$$p_s = p_{s,v} + p_{s,h} \tag{3}$$

where, as shown in FIG. 4A, $p_{s,v}$ is the sum of coherency (inverse of discontinuity) values along the lines connecting point 41 with coordinates (x, $y_u$, z−$l_v$) with point 43 with coordinates (x, y, z) and point 45 with coordinates (x, $y_d$, z+$l_v$). Furthermore, as shown in FIG. 4B, $p_{s,h}$ is the sum of coherency voxel values along the lines connecting points (x−$l_h$, $y_r$, z) 47, (x, y, z) 43, and (x+$l_h$, $y_l$, z) 49 in a z slice.

At the beginning of a fault surface construction, the energy function $E_0$ of an initial fault surface $\Omega_0$ is computed according to Eq. (1). Then, every fault surface point s in $\Omega_0$ is allowed to move up to ±d voxel units in a direction parallel to the y coordinate. Among the (2 d+1) possible voxel locations, the best move for the surface point s that minimizes the energy function is selected as $d_s^*$. Then, the next fault surface is formed by moving each surface point by preferably an α fraction of $d_s^*$, where α is a minimization step size. A value of α less than 1 promotes a stable minimization process.

This iterative minimization repeats until the fault surface energy does not change any more or the change is less than a predetermined value. In another embodiment, one can smooth the voxel movement by applying weighted averages of the optimum voxel movements. Instead of moving the point s by α $d_s^*$, the point s is moved by α $d_s^{}$, where $d_s^{}$ is a weighted average of best moves of the surface points in the vicinity of the point s and weights are inversely proportional to the distances between the point s and the neighboring points. The smoothing window, which defines the neighboring points in domain R, as shown in FIG. 2 is defined as a rectangle that is centered at s with a width $2r_h+1$ and a length $2r_v+1$. Even though the size of this smoothing window could differ from the window size for computing internal and external forces, the same size: $r_h=l_h$ and $r_v=l_v$ is generally acceptable.

The weighting factor λ in Eq. (1) determines the elastic property of the surface. The higher the value the more rigid the surface becomes. An extreme value of λ=1 will force the surface to become close to a flat plane. A low value of λ will let the surface follow low coherence (or high discontinuity) voxel points strictly, which could result in an extremely jagged surface. Normally, better results are obtained when the contribution from the internal force to the weighted sum in Eq.(1) is approximately equal to the contribution from the external force. However, the normalizations of the two forces may be different. Accordingly λ is used as a scaling factor to achieve this balance. For example, when the two terms on the right-hand side of Eq.(3) have values in the range 0 to 255 throughout the seismic data volume, a value of λ in the range 0.9 to 0.95 has been found to provide a reasonable compromise between the internal and external forces in Eq.(1).

Referring to step 9 of FIG. 1, values $2l_v+1$ and $2l_h+1$ represent the vertical and horizontal lengths respectively of a window from which internal force (curvature) and external force (discontinuity value) are computed at a fault surface point s. A computed energy at a surface point s will be very sensitive to noises in discontinuity values if the window size is too small such as ($l_v=l_h=1$). A good reference window size is the size of a window where a significant curvature can be recognized visually. In general, $l_v=5$ and $l_h=5$ (window size of 11 by 11 voxel units) provide good results. The values of $l_v$ and $l_h$ should preferably be between 1 and the maximum resolution the operator can reasonably expect to obtain.

The parameter d is the maximum search distance from a point s in one search iteration. For a large value of d, a deformable surface is allowed to travel far distances in search of a desired fault surface. Too large a value of d (such as, d>30) invites the risk of creating a surface that is quite different, in shapes and locations, from the initial surface. A small value of d will limit the search region. A value in the preferred range of 7 and 20 generally provides good results.

Values $2r_v+1$ and $2r_h+1$ represent the vertical and horizontal lengths of a window defining the neighbors around a point s=(x,y,z). The movement of a point s, $d_s^{**}$, is computed as a weighted average of all the values of $d_s^*$ in this window. This smoothing method prevents neighboring surface points from moving in opposite directions. Typical values of $r_v=5$ and $r_h=5$ (window size of 11 by 11 voxel units) provide good results. The values of $r_v$ and $r_h$ should preferably be between 1 and the maximum resolution the operator can reasonably expect to obtain.

The step size α (0<α≦1) is introduced to stabilize the iterative minimization process. A small value of α, such as 0.1, guarantees high quality minimization at the cost of high computation time. An extremely large value of α, such as 1, makes the process converge fast to the minimum energy state at the risk of reaching an unstable (oscillating minimum energy state) or an incorrect minimum energy state. A value of 0.5 typically provides good results.

This rapid fault interpretation method can be adjusted to work on a wide range of data quality. In good data, where faults are nicely imaged within the coherency/discontinuity volumes, the algorithm discussed above is used preferably with stiffness values in the range 0.8<λ<1 and the best fit to the coherency/discontinuity data is obtained after five to ten iterations. The quality of the solution is a function of how well the input fault sticks describe the overall geometry of the fault surface and not how densely placed they are along the fault.

Algorithms can also be used in bad data where coherency/discontinuity are dominated by noise or by contributions from stratigraphy rather than faults. In such a case, the algorithm discussed above uses a stiffness value of λ≅1 to generate a dense fault interpretation independently of the discontinuity data but honoring closely the interpreted input sticks.

EXAMPLES

A performance example of 20 percent and 30 percent noise is provided below. A synthetic discontinuity data volume of 100×100×100 was created with a target fault surface $y^t$ and an initial fault surface $y^i$ described by the equations:

$$y^t=70-0.2x-0.2z+5(\sin(2\pi x/100)) \quad (4a)$$

$$y^i=75-0.2x-0.2z \quad (4b)$$

Figure 6A:
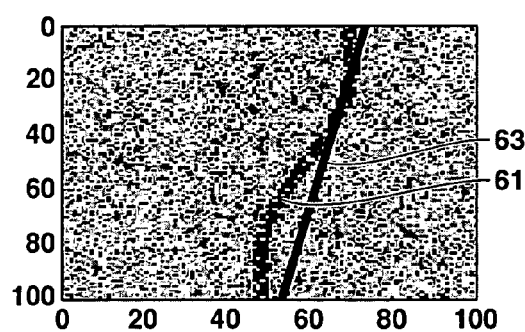
FIG. 6A shows a horizontal slice of the target fault surface and initial fault surface.
Figure 6B:
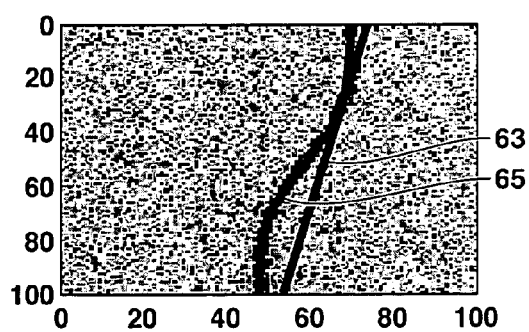
FIG. 6B shows a horizontal slice of the initial fault surface and the final fault surface overlapped over the target fault surface.

FIG. 5 illustrates a curved target fault surface 51 and a flat initial fault surface 53 without noise representing Eq. 4a and Eq. 4b respectively. FIG. 6A illustrates a horizontal slice of the discontinuity volume where the target fault surface 61 is recognized to contain high discontinuity and the initial fault surface 63 is shown as a solid black line. The target fault surface 61 has a mean discontinuity value of 30 and the whole discontinuity volume was corrupted by noises that are uniformly distributed between ±5.1 (20% noise). Default parameter values, λ=0.9, $l_v=5$, $l_h=5$, d=7, α=0.5, $r_v=5$, and $r_h=5$, were used to move the initial fault surface 63 by minimizing the energy function. In this example, 40 iterations were required to latch the initial surface to the final fault surface 65 as shown in FIG. 6B.

Figure 7A:
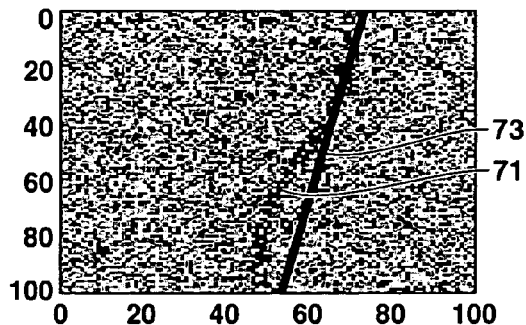
FIGS. 7A, 7B, 7C and 7D show a horizontal slice of the target and initial fault surfaces and the movement of the constructed fault surfaces at different stages of the evolution when 30% noise is added to the discontinuity voxel volume.
Figure 7B:
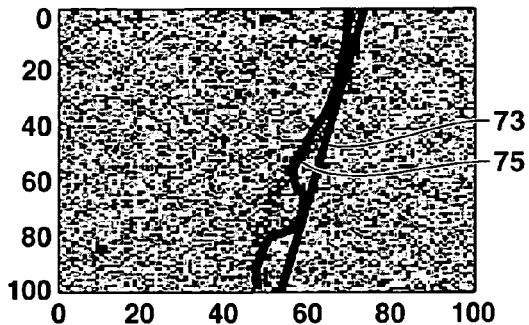
Figure 7C:
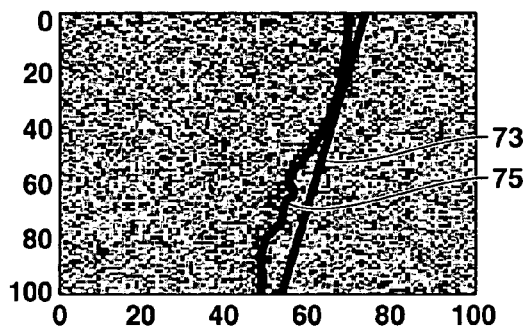
Figure 7D:
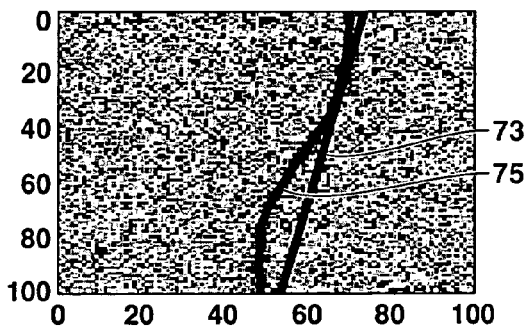

To further test its robustness to noise, the discontinuity voxel volume was corrupted by noise that was uniformly distributed between ±7.65 (30% noise). FIG. 7A illustrates target surface 71 and the initial fault surface 73, where the target fault surface 71 is almost unrecognizable due to severe noises. In this case, a little stiffer surface (λ=0.92) and larger windows for curvature computation and smoothing ($l_v$=5, $l_h$=7, $r_v$=7, and $r_h$=5) were used to deal with severe noises in discontinuity values. FIG. 7B, FIG. 7C and FIG. 7D illustrate horizontal slices of constructed deformable fault surfaces 75 at different stages of energy minimization (iterations of 10, 30 and 49 respectively).

Figure 8A:
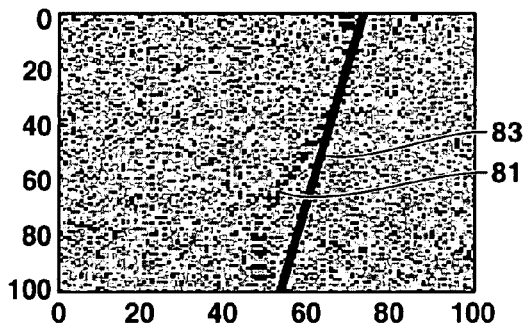
FIGS. 8A, 8B, 8C, and 8D show a horizontal slice of the target and initial fault and the movement of the constructed fault surfaces when 50% of the target fault is missing and 20% noise is added to the discontinuity voxel volume.
Figure 8B:
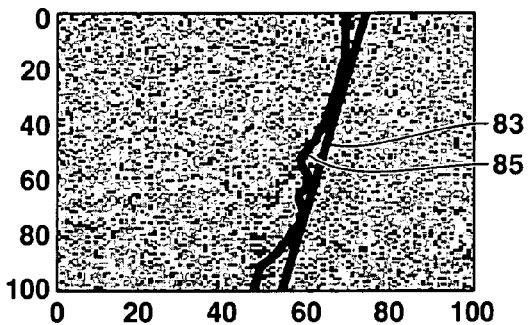
Figure 8C:
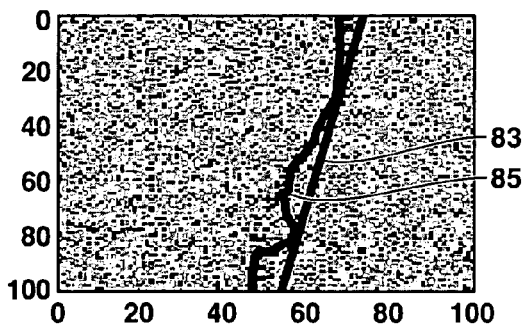
Figure 8D:
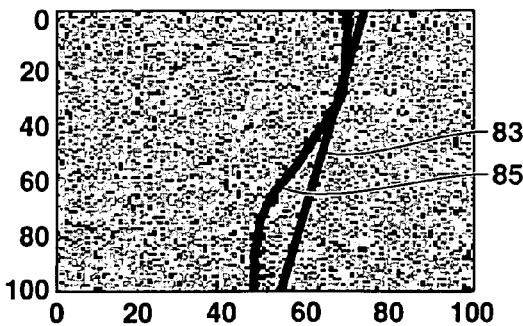

FIGS. 8A through 8D illustrate a case of 20% discontinuity noise and a 50% missing fault section and an initial fault surface 83. In this study, 50% of the target fault $y^f$ 81 in Eq. (4a) was erased in a random manner and the discontinuity data volume was corrupted by noises that is uniformly distributed between ±5.1 (20% noise). As shown in FIG. 8A, the target fault surface 81 is discontinuous, but has some visible structural features. The same parameter set as in the 30% noise case was used. FIG. 8B, FIG. 8C and FIG. 8D shows a horizontal slice illustrating a constructed deformable fault surface 85 from three-dimensional voxel volume data at different stages of the energy minimization (iterations 5, 10 and 47 respectively).

EXAMPLES FROM THREE-DIMENSIONAL SEISMIC DISCONTINUITY DATA

Figure 9A:
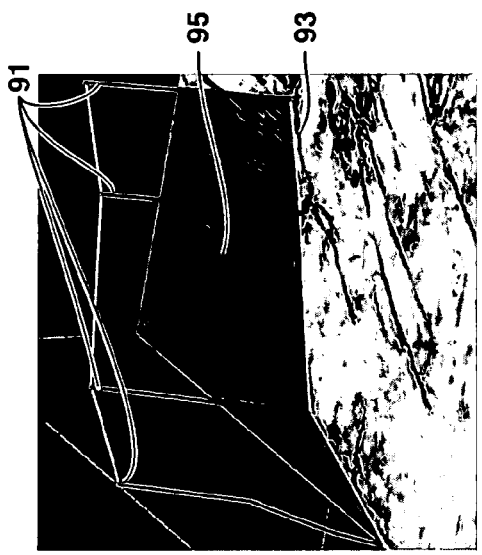
FIGS. 9A, 9B, 9C, and 9D show a graphical flowchart of the steps of an embodiment of the invention using publicly available three-dimensional seismic data from the Gulf of Mexico.
Figure 9B:
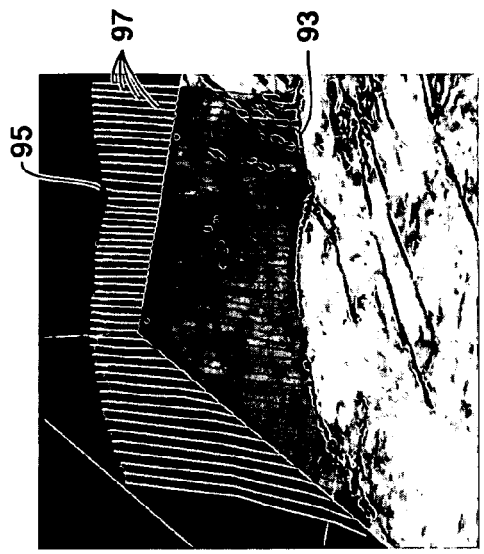
Figure 9C:
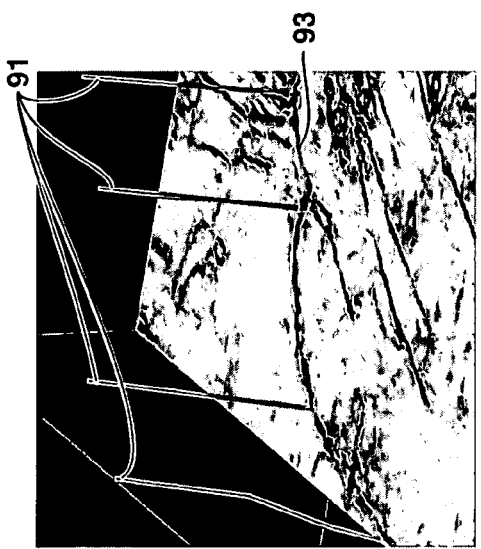

Three-dimensional seismic discontinuity data from the Gulf of Mexico was utilized to illustrate an application of the method to actual data. FIG. 9A shows a sparse set of interpreted vertical sticks 91 displayed in three-dimensions with a time slice of discontinuity. The fault signature (dark line representing high discontinuity) 93 appears clearly as a curved line on the discontinuity time slice. In FIG. 9B, the algorithm (or software) will generate an initial fault surface 95 by interpolating between the fault sticks. At this stage the initial fault surface does not fit the discontinuity data. In FIG. 9C, the initial fault surface 95 is reconstructed to fit the discontinuity data. A stiffness value $\lambda$=0.8 was used and the energy minimization was completed after 15 iterations.

Figure 9D:
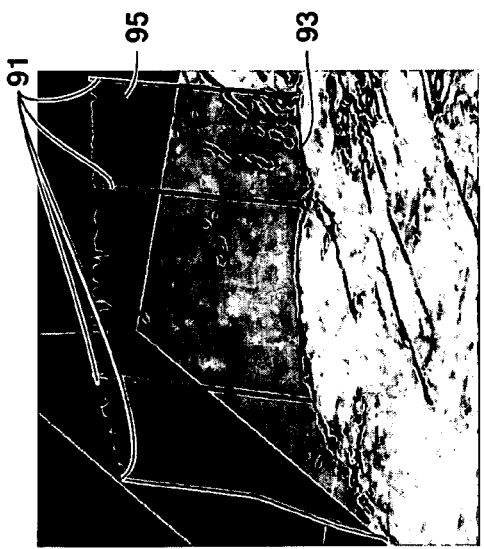

As shown in FIG. 9D, the algorithm outputted the interpreted fault surface 95 as a set of fault sticks 97 (FIG. 9D) that can be edited if required by the seismic interpreter. The whole process from start to finish took about 10 seconds for the fault shown in FIGS. 9A, 9B, 9C and 9D. The process is interactive and can be repeated to correct imperfections along the fault. Families of interpreted faults can also be processed in bulk.

What is claimed is:

1. A method to create a fault surface from a three-dimensional seismic data volume, comprising:
    constructing an initial fault surface in three-dimensions, said surface containing at least two fault sticks, the fault sticks being from the same fault but from different slices of the seismic data volume, each fault stick being defined by at least two fault nodes; and
    reconstructing the initial fault surface to fit the three-dimensional seismic data, said reconstruction using an iterative evolution of a deformable surface model of the fault surface, said evolution being based on smoothness of the fault surface and a fault-indicating parameter of each location on the fault surface.

2. The method of claim 1, wherein the fault nodes are obtained by manual interpretation of the data volume.

3. The method of claim 1, wherein the data volume slices comprise a vertical slice and an horizontal slice.

4. The method of claim 1, wherein the seismic data comprise seismic amplitude discontinuity data, and the fault-indicating parameter is the seismic amplitude discontinuity.

5. The method of claim 4, wherein the iteration of the deformable surface model uses local minimization of an energy function of such surface, said function having as variables the curvature of the fault surface and the discontinuity in seismic amplitudes, each variable being itself a function of spatial location on the fault surface, and wherein the iteration is terminated when the change in the surface energy relative to the preceding iteration is less than a pre-determined value.

6. The method of claim 5, wherein the energy function is a weighted sum of an internal force and an external force, said internal force being a function of curvature of the fault surface and said external force being a function of seismic amplitude discontinuity on the fault surface.

7. The method of claim 1, wherein the seismic data comprise seismic amplitude coherency data, and the fault-indicating parameter is the seismic amplitude coherency.

8. The method of claim 7, wherein the iteration of the deformable surface model uses local minimization of an energy function of such surface, said function having as variables the curvature of the fault surface and the coherency in seismic amplitudes, each variable being itself a function of spatial location on the fault surface, and wherein the iteration is terminated when the change in the surface energy relative to the preceding iteration is less than a pre-determined value.

9. The method of claim 8, wherein the energy function is a weighted sum of an internal force and an external force, said internal force being a function of curvature of the fault surface and said external force being a function of seismic amplitude coherency on the fault surface.

10. The method of claim 6 or claim 9, wherein the weighted sum uses a weighting factor $\lambda$ for the internal force and a weighting factor ($1-\lambda$) for the external force, $\lambda$ being selected to provide substantially equal contributions to the energy function from the internal and external forces, except for noisy data where $\lambda$ is chosen substantially equal to 1.

11. The method of claim 1, wherein a fault surface is assumed to be a single-valued function of two orthogonal geographic coordinates, and all voxels in the fault surface are allowed to move only in the third orthogonal direction in the course of iterative deforming of the surface model, said single-valued function being in the form of $x=f(y,z)$ if the angle between a fault surface and the y-z plane is less than 45 degrees, and $y=f(x,z)$ if the angle between a fault surface and the y-z plane is greater than 45 degrees, the coordinate z being in the vertical direction.

12. The method of claim 1, wherein constructing an initial fault surface comprises the steps of:
    (a) generating a pre-selected density of fault points along each fault stick by performing linear interpolation between fault nodes;
    (b) identifying the extent of the boundaries of the fault surface by using the interpolated fault points from step (a); and
    (c) constructing an initial fault surface within said boundaries by using bilinear interpolation of the interpolated fault points from step (a).

13. The method of claim 1, wherein the reconstructed fault surface is defined by a discrete set of fault sticks.

14. The method of claim 1, wherein the seismic data comprise seismic amplitude discontinuity and coherency data, and the fault-indicating parameter is a combination of the seismic amplitude discontinuity and the seismic amplitude coherency.

* * * * *